United States Patent [19]
Yu et al.

[11] Patent Number: 5,671,171
[45] Date of Patent: Sep. 23, 1997

[54] SHARED ROUNDING HARDWARE FOR MULTIPLIER AND DIVIDER/SQUARE ROOT UNIT USING CONDITIONAL SUM ADDER

[75] Inventors: Robert K. Yu, Newark; Grzegorz B. Zyner, San Jose, both of Calif.

[73] Assignee: Sun Microsystems, Inc., Mountain View, Calif.

[21] Appl. No.: 498,093

[22] Filed: Jul. 5, 1995

[51] Int. Cl.[6] .............................. G06F 7/52; G06F 7/552
[52] U.S. Cl. ........................................................ 364/748
[58] Field of Search ................................... 364/745, 748

[56] References Cited

U.S. PATENT DOCUMENTS

| | | | |
|---|---|---|---|
| 5,235,533 | 8/1993 | Sweedler | 364/745 |
| 5,245,563 | 9/1993 | Hauck, Jr. | 364/745 |
| 5,257,215 | 10/1993 | Poon | 364/745 |
| 5,258,943 | 11/1993 | Gamez et al. | 364/745 |
| 5,511,016 | 4/1996 | Béchade | 364/745 |

OTHER PUBLICATIONS

Claude P. Lerouge, Pierre Girard, Joel S. Colardelle, "A Fast 16 Bit NMOS Parallel Multiplier", IEEE Journal of Solid-State Circuits, vol. SC-19, No. 3, Jun. 1984.

Ramautar Sharma, Alexander D. Lopez, John A. Michejda, Steven J. Hillenius, John M. Andrews, Arnold J. Studwell, "A 6.75-ns 16×16-bit Multiplier in Single-Level-Metal CMOS Technology", IEEE Journal of Solid-State Circuits, vol. 24, No. 4, Aug. 1989.

W.K. Luk, J.E. Vuillemin, "Recursive Implementation of Optimal Time VLSI Integer Multipliers", 1983.

*Primary Examiner*—David H. Malzahn
*Attorney, Agent, or Firm*—Limbach & Limbach L.L.P.

[57] ABSTRACT

A floating point mantissa final addition and rounding unit uses a conditional sum adder to reduce a redundant carry-save format 106-bit mantissa to a non-redundant properly rounded 53-bit double-precision mantissa. The conditional sum adder simultaneously speculatively computes both the sum and the incremented sum of the upper 52 bits of the carry-save portions. A rounding unit speculatively computes the lower one bit and two bits of the mantissa for the cases of mantissa overflow or non-overflow, respectively. The rounding unit produces an overflow carry signal and a non-overflow carry signal. A multiplexor selects the proper 53 mantissa output bits from among the two conditional sum adder outputs and the rounding unit mantissa outputs depending upon the most significant bits of the two conditional sum adder outputs and the overflow and non-overflow carry signals. The floating point mantissa final addition and rounding unit is used to perform the final addition and rounding for a multiplier that produces a 106-bit carry-save result and for a division/square root unit that produces a 56-bit non-redundant result. A multiplexor selects the input from among the multiplier carry-save result and the division/square root unit non-redundant result. When the division/square root result is selected, the carry portion and the less significant 50 bits of the sum portion are set equal to zero. When a non-redundant result is input into the final addition and rounding unit, the conditional sum adder acts merely as an incrementer.

30 Claims, 5 Drawing Sheets

SHARED ROUNDING HARDWARE FOR MULTIPLIER AND DIVIDER/SQUARE ROOT UNIT USING CONDITIONAL SUM ADDER

BACKGROUND OF THE INVENTION

1. Field of the Invention

The present invention relates to the field of microprocessor floating point units. Specifically, the present invention involves rounding hardware that can be shared among more than one floating point functional unit and that accepts either a carry-save format or a non-redundant format mantissa input.

2. Discussion of the Related Art

The IEEE standards for floating point numbers provide for 52 fraction bits for double precision and 23 fraction bits for single precision. By concatenating the implicit leading one to the fraction bits, the mantissa of the represented number is formed. Therefore, a double precision mantissa is 53 bits, while a single precision mantissa has 24 bits.

The standard double precision data format is formed by concatenating a sign (s) bit, an exponent (exp), and a fraction (frac) as shown below.

s, exp [10:0], frac [51:0]

If a normalized number is being represented, its value is $(-1)^s * 2^{exp-B} * 1.frac$. Here, B stands for bias and is 1023 for double precision floating point data. The double precision mantissa is 1.frac.

The multiplication of any two n-digit numbers produces an output which has either 2n or 2n−1 significant digits, depending upon the sizes of the two numbers. Therefore, the multiplication of two double precision floating point mantissas can produce a 106-bit mantissa output. Because it is generally desirable to have the result in the same precision as the operands, only 53 bits of mantissa are output from such a multiplication. Thus, the lower 53 mantissa result bits are used to correctly perform rounding on the upper 53 mantissa result bits.

The 106-bit mantissa output of a multiplication will typically be produced in redundant carry-save form, having carry and sum portions. Redundant form implies that there is more than one way to represent any given number. A number in carry-save form has two portions—a carry portion and a sum portion. The value of the number being represented is the result of an addition of the carry and sum portions. The conversion of the redundant carry-save multiplier output into non-redundant form is performed by an addition, typically referred to as the final addition. Therefore, typically a final addition is performed on the redundant carry-save multiplier output before rounding is performed.

Several modern microprocessors include hardware dividers in their floating point units. Most hardware dividers produce a non-redundant result. Therefore, a final addition is not necessary. The divider output need only be rounded properly. Proper rounding normally requires truncating the output at the desired level of precision and then conditionally incrementing the output depending upon the specifics of the truncated bits.

Figure 1:
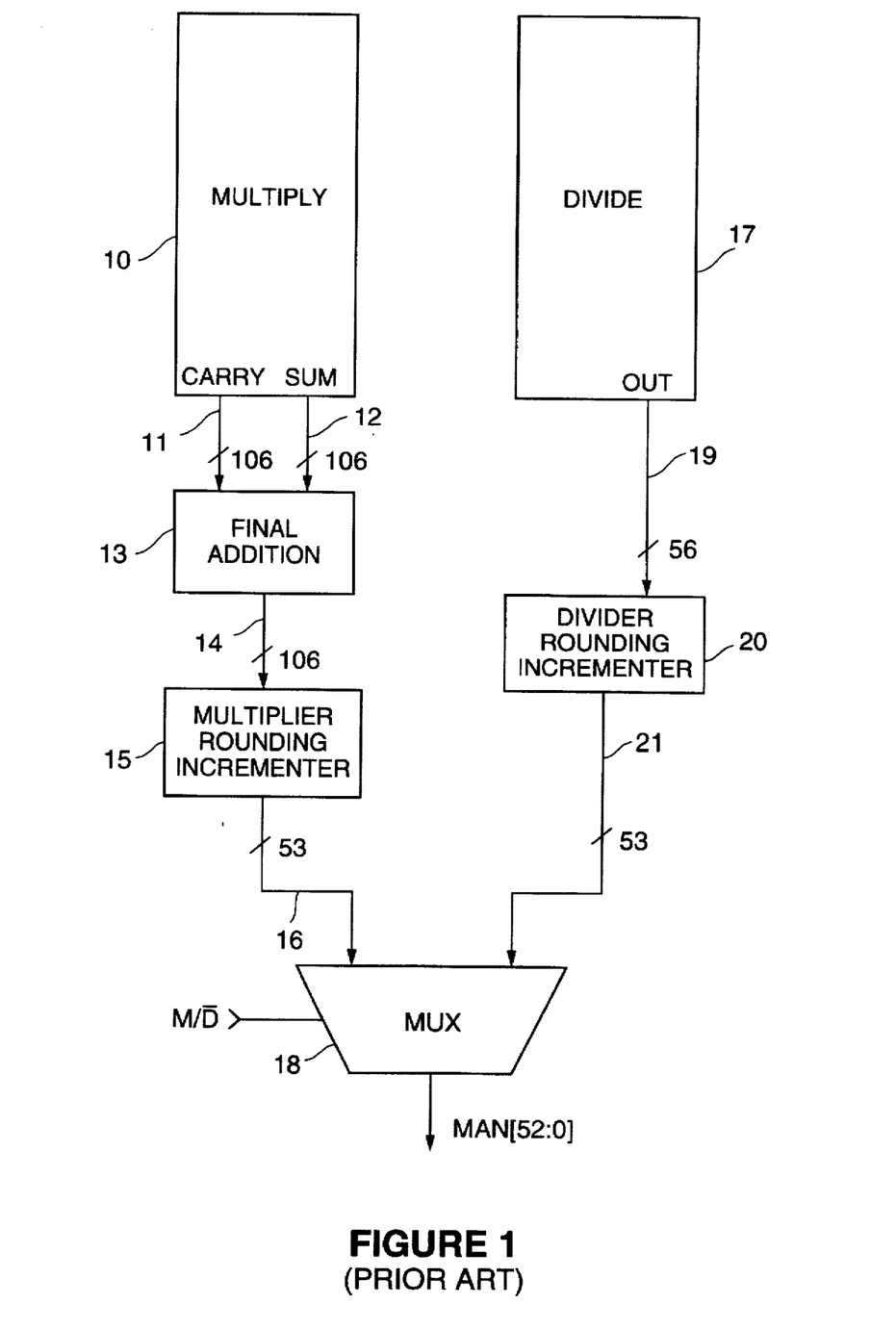
FIG. 1 is a simplified block diagram illustrating a typical floating point unit having hardware multiplier and divider modules.

FIG. 1 is a simplified block diagram of a typical rounding architecture for a floating point unit that has both a multiplier and a divider. The hardware multiplier 10 produces its 106-bit output in carry-save format. The carry portion 11 and sum portion 12 of the multiplier 10 output are processed by the final adder 13, which is typically merely a standard carry propagate adder. The non-redundant multiplier result 14 is input into a multiplier rounding incrementer 15 which examines the lower half of the 106 bits of non-redundant output 14, and produces a correctly rounded result 16 having only 53 bits.

The divider 17 provides its non-redundant output 19 to a divider rounding incrementer 20. The divider rounding incrementer 20 performs a similar function to the multiplier rounding incrementer 15, with the exception that the divider rounding incrementer 20 takes fewer input bits 19. The division algorithm is substantially more complicated than multiplication, and generally at most a few mantissa bits per cycle can be generated even in hardware. Therefore, the divider 17 will normally produces only slightly more than the minimum number of bits required for the given precision so that rounding can be properly performed. A 56-bit division result 19 is typical, while the output 21 of the divider rounding incrementer 20 has only 53 bits.

Because the typical floating point unit is designed and scheduled so that only one unit (either the multiplier 10 or the divider 17) will produce a result during any given cycle, a multiplexor 18 is used to select the output of the unit producing the result. The final mantissa output MAN[52:0] has 53 bits, and is used to produce a 52-bit fraction part of the IEEE floating point data representation. The most significant bit MAN[52] is necessary to distinguish a normal result from a sub-normal result. A normal result has a leading one, while a sub-normal result begins with a zero. Thus, although the most significant bit is implied rather than explicitly included in the IEEE standard data format, it must be delivered to facilitate properly setting the exponent.

As illustrated in FIG. 1, prior art floating point units suffer from the drawback that each functional unit 10 and 17 has its own rounding incrementer 15 and 20, even though the incrementers 15 and 20 are not used simultaneously.

SUMMARY OF THE INVENTION

One object of the present invention is to provide a floating point unit that shares the final addition and rounding logic between two separate mantissa processing units, such as a multiplier and a divider/square root unit. Another object of the present invention is to provide a final addition and rounding unit that combines the final addition and the incrementing function into one unit so as to minimize latency.

According to a second aspect of the present invention, a floating point mantissa final addition and rounding unit uses a conditional sum adder to reduce a redundant carry-save format 106-bit mantissa to a non-redundant properly rounded 53-bit double-precision mantissa. The conditional sum adder simultaneously speculatively computes both the sum and the incremented sum of the upper 52 bits of the carry-save portions. A rounding unit speculatively computes the lower one bit and two bits of the mantissa for the cases of mantissa overflow or non-overflow, respectively. The rounding unit produces an overflow carry signal and a non-overflow carry signal. A multiplexor selects the proper 53 mantissa output bits from among the two conditional sum adder outputs and the rounding unit mantissa outputs depending upon the most significant bits of the two conditional sum adder outputs and the overflow and non-overflow carry signals.

According to a first aspect of the present invention, the floating point mantissa final addition and rounding unit is used to perform the final addition and rounding for a multiplier that produces a 106-bit carry-save result and for a division/square root unit that produces a 56-bit non-redundant result. A multiplexor selects the input from among the multiplier carry-save result and the division/square root unit non-redundant result. When the division/square root result is selected, the carry portion and the less significant 50 bits of the sum portion are set equal to zero.

According to a third aspect of the present invention, when a non-redundant result is input into the final addition and rounding unit, the conditional sum adder acts merely as an incrementer.

These and other aspects of the present invention are presented in the detailed description with references to the FIGS. 1 through 6.

BRIEF DESCRIPTION OF THE DRAWINGS

The various aspects of the present invention are apparent from the drawings as explained in the detailed description. The same reference labels and reference numerals are applied to the same drawing features, even when those features are shown in multiple Figures.

DETAILED DESCRIPTION OF THE INVENTION

Figure 2:
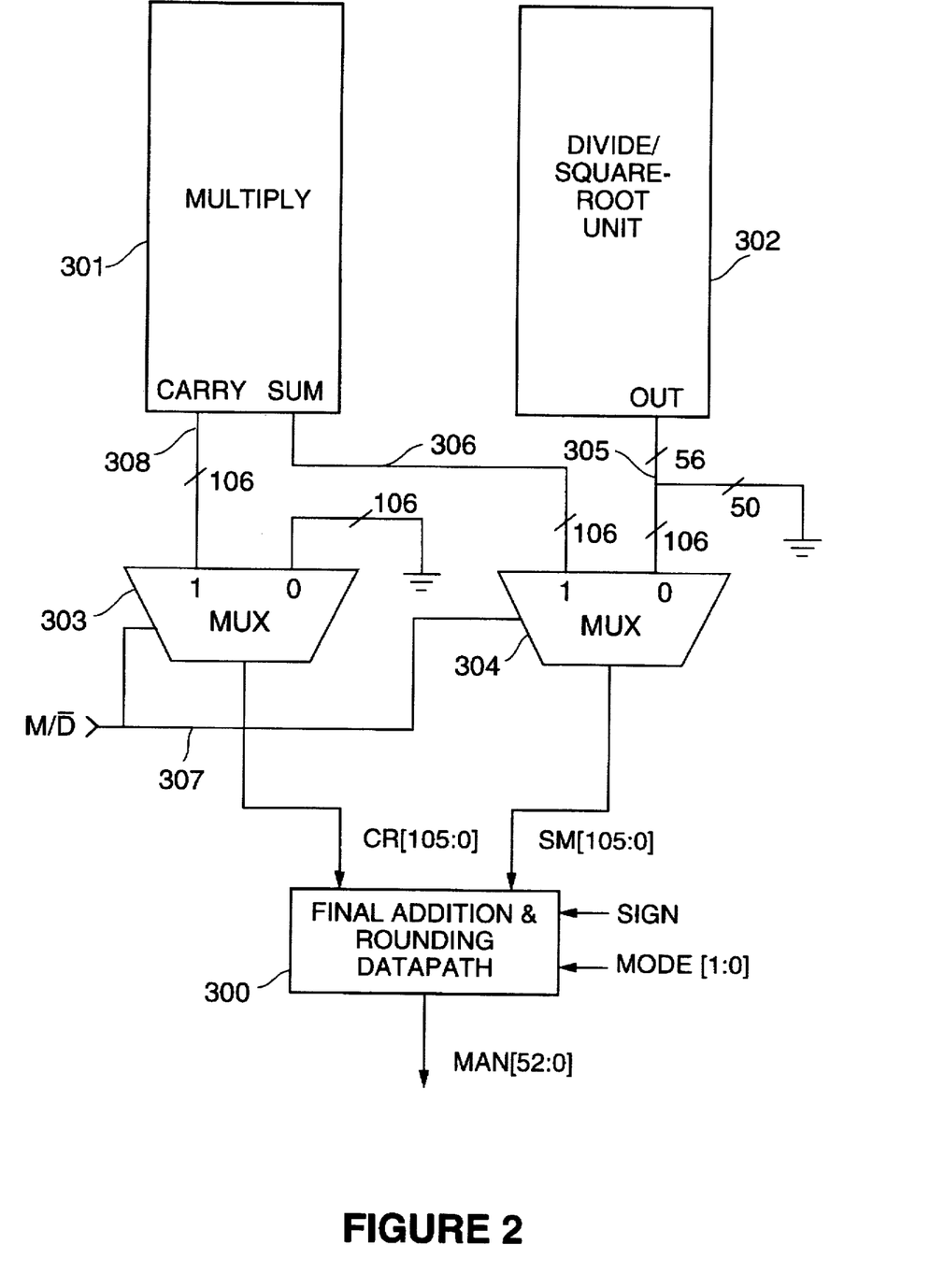
FIG. 2 is a simplified block diagram illustrating a floating point unit having hardware multiplier and divider modules according to a first aspect of the present invention.

FIG. 2 shows simplified block diagram of a floating point unit with a multiplier and divider/square root unit according to a first aspect of the present invention. All the hardware 300 (illustrated in detail in FIG. 3) is shared between the multiplier unit 301 and the division/square root unit 302. Two 106-bit multiplexors 303 and 304 are used to connect the appropriate carry and sum outputs to the correct inputs. Because of the nature of the algorithm which produces the division/square-root results, the division/square-root unit 302 outputs a 56-bit non-redundant mantissa output 305 which includes 53 bits of mantissa and the G (guard), R (round), and S (sticky) bits. Therefore, the division/square-root unit 302 does not produce its mantissa output 305 in carry-save form, and there is no need for a final addition for results from the division/square-root unit 302. However, the mantissa result 305 of the division/square-root unit 302 must still be rounded properly according to the sign of the output mantissa (SIGN) and the rounding mode (MODE[1:0]) The SIGN is easily calculated for multiplication and division by an XNOR (exclusive nor) gate whose inputs are the sign bits of the two operands; for square root, SIGN is zero, indicating a positive result.

If rounding introduces a carry into the least significant mantissa bit position of the division mantissa output 305, then the result 305 of the division/square-root unit 302 must be incremented. If the division/square-root mantissa result 305 needs to be incremented, a carry could propagate all the way to the most significant bits of the mantissa. Therefore, although the final addition stage is not necessary to reduce the mantissa result 305 from the division/square-root unit 302 into non-redundant form, an incrementer is necessary for rounding purposes.

Multiplexor 304 has two data inputs and one control input; the first data input is connected to the 106-bit sum portion 306 output from the multiplier 301; the most significant 56-bits of the second data input are connected to the 56-bit division mantissa output 305 from the division/square root unit 302; the least significant 50 bits of the second data input are set to zero; and the control input is connected to a M/D signal which indicates whether the output SM[105:0] (sum portion) is provided from the multiplier 301 or the division/square root unit 302. Multiplexor 303 has two data inputs and one control input; the first data input is connected to the carry portion 308 of the multiplier 301 output; the second data input is connected to zero; the control input is connected to the M/D signal; and the output CR[105:0] (carry portion) is connected to the final addition and rounding datapath 300 input.

Figure 3:
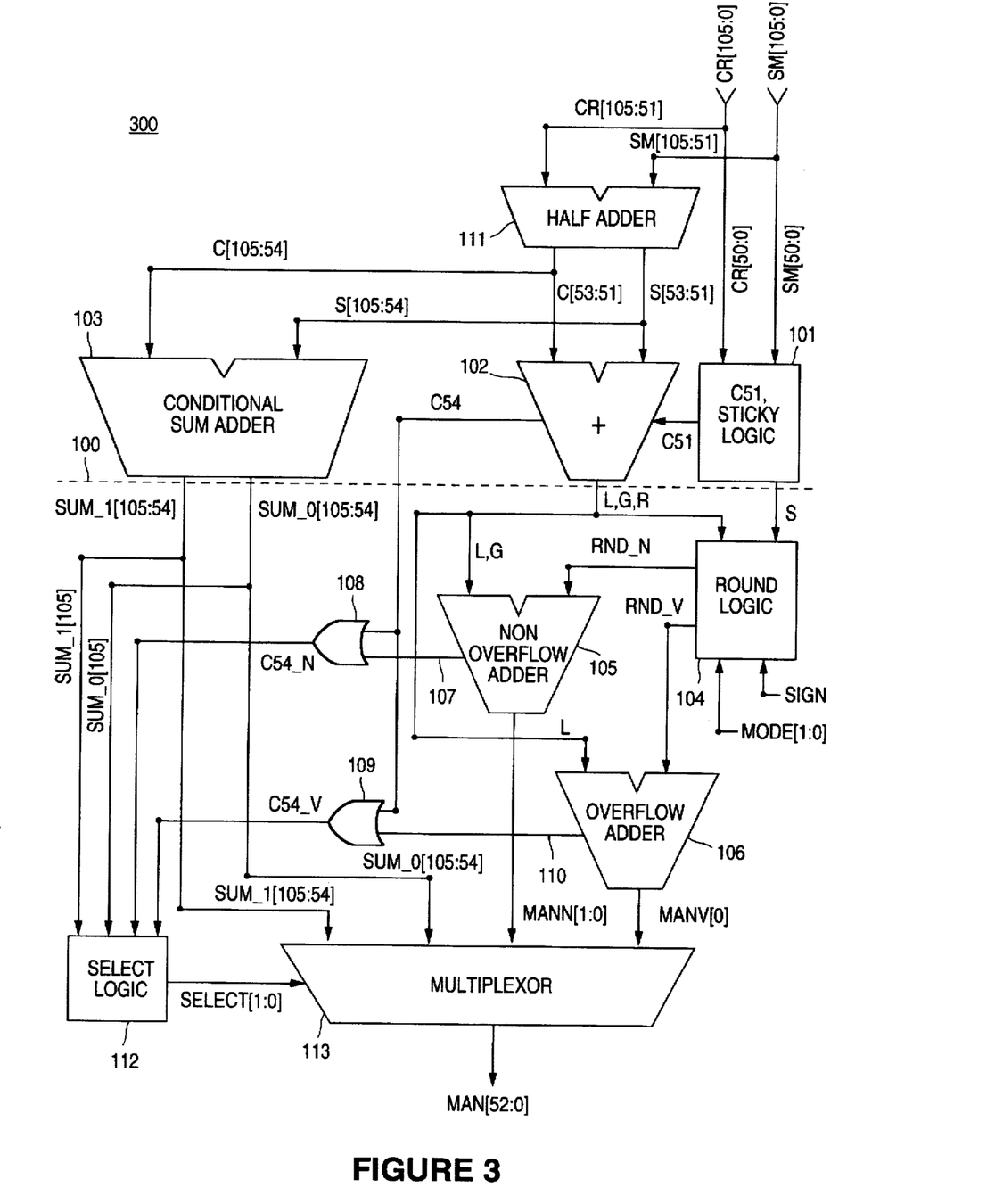
FIG. 3 is a block diagram illustrating the final addition and rounding datapath according to a second aspect of the present invention.

FIG. 3 shows a block diagram of the final addition and rounding datapath and logic according to a second aspect of the present invention. The dotted line 100 represents a good placement of pipeline registers if they are necessary; the final addition operation and rounding can be performed in separate clock cycles, such that the final addition is before the pipeline registers 100, and the rounding operation is after the pipeline registers 100. The final addition and rounding are somewhat merged in the sense that the conditional sum adder 103 which performs the final addition reduces a redundant mantissa from a multiplication into a non-redundant mantissa (final addition), and speculatively computes the incremented version of the mantissa (rounding). Redundant form implies more than one way to represent any given number. In FIG. 3, the carry and sum portions of the mantissa result from the multiplier or division/square root unit are labeled CR[105:0] and SM[105:0], respectively. Because the final mantissa output after the rounding must be in non-redundant form, the sum and carry portions must be added.

Figure 4:
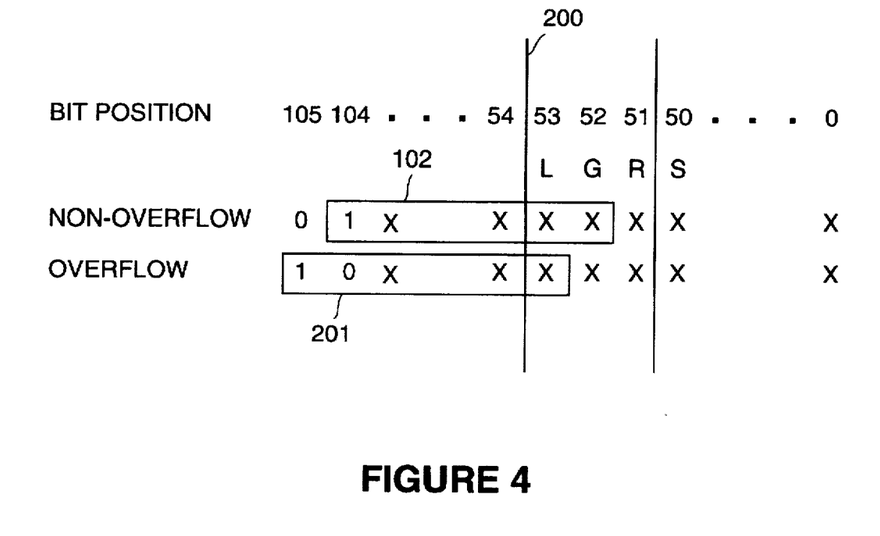
FIG. 4 illustrates the mantissa selection and bit definitions for overflow and non-overflow.

FIG. 4 shows the two possibilities for the resultant mantissa in a floating point multiplication. When bit 105 of the resulting mantissa is zero, the mantissa has not overflown, thus a non-overflow condition is detected. Alternatively, when bit 105 is one, the mantissa has overflown, and an overflow condition is detected. In double precision multiplication, after the 106-bit product in non-redundant form has been generated, the decimal point occurs between bits 104 and 103. Thus, the mantissa in non-overflow takes the form 1.xxxx ... xxxx, while the mantissa in overflow takes the form 10.xxxx ... xxxx. Only the upper 53-bits are used for the mantissa result. The lower 53-bits are needed only to perform the correct rounding on the upper 53 bits. After rounding is performed, either bits 105-53 or bits 104-52 are used to form the output mantissa MAN[52:0] depending on the value of bit 105, which is the most significant bit of the 106-bit mantissa result. If bit 105 is set, then the mantissa result is taken from bits 105-53. This is illustrated in FIG. 4 by the box 201 surrounding bits 105 through 53 for the overflow condition. In this case, the fraction part of the mantissa output is bits 104 through 53, and the value of the calculated exponent is incremented by one to compensate for the fact that the mantissa has essentially been divided by two by moving the decimal point one position to the left. Alternatively, if bit 105 is not set, then bits 104-52 represent the mantissa of the result, thus the fraction part is taken from bits 103 through 52, and the exponent is not incremented because the decimal point has not been altered. This is illustrated by the box 202 surrounding bits 104 through 52.

FIG. 3 shows the logical partitioning of the final addition, which occurs above the dotted line 100 that represents the pipeline registers. CR[105:0] and SM[105:0] are divided into three separate portions. A 52-bit conditional sum adder 103 takes the most significant 52 redundant mantissa bits, C[105:54] and S[105:54], and produces two outputs, Sum__1[105:54] and Sum__0[105:54]. The two outputs are related by the following equations.

Sum__0[105:54]=C[105:54]+S[105:54]

Sum__1[105:54]=Sum__0[105:54]+1

Figure 5:
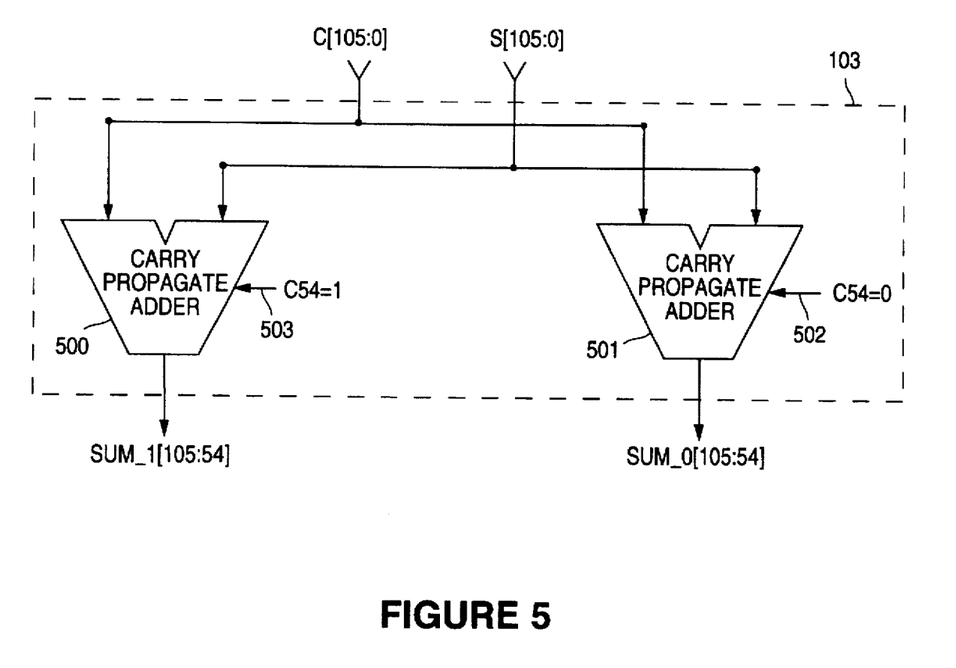
FIG. 5 illustrates the logic performed by a conditional sum adder.

The conditional sum adder 103 therefore adds the sum and carry portions of the redundant mantissa, and produces the result of that addition (Sum__0) and an incremented version of that result (Sum__1). Sum__1[105:54] is speculatively computed so that if either rounding or the final addition from the low order sum and carry mantissa bits produces a carry into bit position 54, the appropriate result will be immediately available. As illustrated in FIG. 5, the conditional sum adder 103 performs the same logic as two separate propagate adders 500 and 501, one with a deasserted carry input 502, and another with an asserted carry input 503. Although a conditional sum adder can be implemented as shown in FIG. 5, it is generally practical to optimize the logic of the conditional sum adder so that less hardware is used to achieve similar latency.

The remaining two portions of CR[105:0] and SM[105:0] are used to produce quantities used for rounding purposes. Referring again to FIG. 3, C[53:51] and S[53:51] are input into a propagate adder 102 which produces bits used for rounding. CR[50:0] and SM[50:0] are input into a logic module 101 which computes the sticky bit S and the carry c51 into bit position 51.

Carry-propagate adder 102 takes the sum bits S[53:51], the carry bits C[53:51], and the c51 carry output of the c51, sticky logic 101 as inputs and creates the L, G, and R bits, listed in decreasing order of significance. L stands for the least significant bit of the result; G stands for the guard bit; and R stands for the round bit.

The c51, sticky logic 101 uses the least significant 51 bits from the floating point unit which produced the result to generate two signals: c51 and S, which are the carry into bit position 51 and the sticky bit S, respectively.

The sticky bit S indicates whether or not the result is exact. If any of the least significant 51 non-redundant bits are asserted, the sticky bit S is asserted; conversely, only when all of the 51 least significant bits of the output are zero is the sticky bit S deasserted, indicating an exact result. The result is necessarily inexact when one or more of the low order bits is one, because these low order bits are used for rounding purposes only and are not included in the output mantissa. The extra precision provided by the non-zero low order bits is lost when the result is rounded. The sticky bit S is therefore the logical OR of the least significant 51 bits of the result. Typically, the least significant 51 bits from the non-redundant mantissa 106-bit result are ORed together to form the sticky bit S; however, this first requires that the sum and carry portions of the lower 51 bits be added together to generate the non-redundant least significant 51 bits, because the non-redundant least significant 51 bits might be zero even though many of the bits of the sum and carry portions were non-zero. This implies the need for a 51-bit carry propagate adder and a 51-input OR tree to generate the sticky bit S. However, the sticky bit can be directly computed from the sum and carry portions of the lower 51 bits, CR[50:0] and SM[50:0], respectively.

The preferred implementation of the c51 portion of the logic block 101 is simply a carry look ahead circuit which computes the carry output for two 51 bit inputs. The following terms are defined and implemented using standard OR and XOR gates. In the following equations, $s_i$ and $c_i$ are the sum and carry portions of the ith bit.

$$p_i = s_i \oplus c_i$$

$$h_i = s_i + c_i$$

$$t_i = p_i \oplus h_{i-1}$$

The sticky bit S is then computed as follows.

$$S = t_0 + t_1 + \ldots + t_{50}$$

The L, G, R, and S bits are used by the round logic 104 to generate two rounding values. One value assumes a mantissa overflow ($RND_{13}$ V), and the other assumes mantissa non-overflow ($RND\_N$). These rounding values are added to the L and [L,G] bits to form the lower one and two bits of the resulting mantissa for overflow and non-overflow, respectively.

The rounding logic 104 takes L, G, R, and S as data inputs. Additionally, it takes a sign signal and mode[1:0] signals as control inputs. The sign signal represents the sign of the result. The IEEE standard is essentially a sign/magnitude representation. Thus, for multiplication and for division, the sign of the result can be easily computed by an equivalence gate (XNOR gate) (not shown) that takes the sign bits of the two operands as inputs; for square root, the result is assumed to have a positive sign. The rounding modes are as follows.

| Mode [1:0] | Round to: |
|---|---|
| 00 | Nearest, else even |
| 01 | 0 |
| 10 | +Infinity |
| 11 | −Infinity |

The following table illustrates the combinational logic which the rounding logic module 104 uses to compute RND__V and $RND_{13}$ N.

| | Sign | |
|---|---|---|
| Mode [1:0] | 0 | 1 |
| 00 | R'/S'G' + R'S' | R'/S'G' + R'S' |
| 01 | 0 | 0 |
| 10 | R' + S' | 0 |
| 11 | 0 | R' + S' | where:
Non-Overflow (RND__N):
G' = G, R' = R, and S' = S
Overflow (RND_V):
G' = L, R' = G, and S' = R + S As illustrated in FIG. 4, L, G, R, and S are defined as being bits 53 through 50, respectively, of the non-redundant mantissa. The primed variables L', G', R', and S', are the effective rounding bits, and represent bits 54 through 51 in the case of overflow. When non-overflow is assumed, the primed variable are the same as their unprimed equivalents. When overflow is assumed, the effective rounding bits are shifted one bit position to the left; therefore, the primed variables are the same as the unshifted bits one position to the left, because overflowing results in all mantissa bits being shifted one position to the right. The sticky bit is the logical OR of all the remaining bits of equal or less significance. S'=R+S for the overflow case merely indicates that when all bits are shifted one bit position to the right, the effective sticky bit S' includes one additional ORed term S.

Referring again to FIG. 3, two small propagate adders 106 and 105 are used to compute the least significant bit MANN [0] or bits MANV[1:0] of the mantissa. The overflow adder 106 assumes mantissa overflow, while the non-overflow adder 105 assumes non-overflow. The non-overflow adder 105 is essentially a two-bit carry propagate adder, and it takes [L, G] and RND_N as inputs and produces a two-bit output MANN[1:0] which corresponds to the least significant two bits of a properly rounded mantissa output when the mantissa did not overflow. The overflow adder 106 is essentially a single half adder cell which takes L and RND_V as inputs to produce a single bit output MANV[0] which corresponds to the least significant bit of a properly rounded mantissa output when the mantissa did overflow into bit 105. As shown in FIG. 3, OR gate 108 logically ORs the carry output 107 of the non-overflow adder 105 with the carry output signal c54 output by the propagate adder 102 which initially generated the L, G, and R bits. The output of this OR gate 108 is the c54_N signal, which is used to select the appropriate Sum_0 or Sum_1 output from the conditional sum adder in the case of mantissa non-overflow. The c54_N signal is asserted when either a carry due to the final addition of the less significant bits of the redundant mantissa or a carry due to a rounding increment creates a carry into bit position 54. As will be discussed below, the row of half adders 111 prevents both sources of a carry from occurring simultaneously. Similarly, OR gate 109 logically ORs the carry output 110 of the overflow adder 106 with the carry output signal c54 output by the propagate adder 102 which initially generated the L, G, and R bits. The output c54_V of this OR gate 109 is used to select the appropriate SUM_0[105:54] or SUM_1[105:54] output from the conditional sum adder 103 in the case of mantissa overflow into bit position 105. The row of half adders 111 also prevents both inputs into OR gate 109 from simultaneously being asserted.

Either the assertion of c54_N in the case of mantissa non-overflow or the assertion of c54_V in the case of mantissa overflow results in a carry into bit position 54, and thus indicates that SUM_1[105:54] contains the correct mantissa output, because that output is the incremented version of the upper 52 mantissa bits. Conversely, either the deassertion of c54_N in the case of mantissa non-overflow or the deassertion of c54_V in the case of mantissa overflow results in no carry into bit position 54, and thus indicates that SUM_0[105:54] contains the correct mantissa output, because that output is the non-incremented version of the upper 52 mantissa bits.

Because of the c51 signal and a rounding that may occur at bit 53 in the case of overflow or bit 52 in the case of non-overflow, there is a possibility of introducing two carries into bit position 54. This possibility arises out of the fact that the reduction of the initial carry and sum portions of the floating point mantissa, CR[105:0] and SM[105:0], respectively, into non-redundant form might possibly produce a carry into bit position 54. In that situation, c54 would be asserted. Additionally, however, depending on the values of L and G, it is possible for one of the outputs (RND_N or RND_V) of the rounding logic 104 to be asserted so as to propagate a carry into bit position 54 through carry outputs 107 or 110, respectively. Two carries into the same bit position are unacceptable and cannot be allowed to happen. This situation is disallowed because "Sum_2" is not precomputed; Sum_1 would have to be incremented by one to produce the correct mantissa. For example, if both c54 and the carry output 107 of the non-overflow adder 105 were simultaneously asserted in the case of mantissa non-overflow, the correct mantissa output would not be contained in either output (SUM_0[105:54] or SUM_1[105:54]) of the conditional sum adder 103. Instead, the correct mantissa output would be contained in SUM_1[105:54]+1, therefore requiring another carry propagate addition.

To ensure that only one carry is propagated into bit position 54, a row of half-adders 111 converts the redundant initial mantissa result CR[105:51] and SM[105:51] into C[105:54] and S[105:54], respectively. The half-adders 111 propagate some of the asserted carries in the carry portion CR into the next higher bit positions while still in redundant form. Using this approach, it is impossible for both inputs of either OR gate 108 and 109 to be simultaneously asserted. The row of half adders insures that C[51], which is the least significant mantissa carry portion input into the L, G, and R propagate adder 102, will be zero at the final addition stage. Furthermore, it insures that S[i] and C[i +1] cannot simultaneously be asserted for any i between 51 and 104, inclusive.

It is possible for an asserted c51 signal to cause a carry propagation through c54 of the L, G, and R adder 102 and through the OR gates 108 and 109. However, if this occurs, L, G, and R will necessarily be zero, and it will therefore be impossible for either the non-overflow adder 105 or the overflow adder 106 to produce a carry output 107 and 110.

It is also possible for S[53] and C[53] to both be asserted, so that a carry into bit position 54 occurs regardless of c51. However, if this occurs, it is impossible for c51 to propagate a carry into bit position 53, thus producing a L bit equal to one; it is impossible for the L bit to equal one under these circumstances because at least one of bit positions 52 and 51 will have sum and carry portions which are both zero, and this zeroed position will absorb any carries into that position without propagating it into bit position 53 and asserting L. Therefore, when c54 is asserted, since L will necessarily be zero, it will be impossible for the rounding logic 104 to propagate a second carry into bit position 54.

By the same token, if L is one, it is asserted either because S[53] and C[53] are both zero and a carry propagated into bit position 53 or because one of S[53] and C[53] was asserted and no carry propagated into bit position 53. In either case, c54 cannot be asserted. Therefore, if L is one, the rounding logic is the only source of a carry into bit position 54.

The select logic 112 determines how to combine the appropriate portions of either SUM_0[105:54] or SUM_1 [105:54] from the conditional sum adder 103 with either MANN[1:0] or MANV[0] from the rounding adders 105 and 106 to form the final mantissa. By using a conditional sum adder 103 to generate both the sum and the sum plus one of the carry C[105:54] and sum S[105:54] portions of the result, an incrementer is not required to correctly round the result. Instead, only multiplexing is required to select the correct result after rounding. The mantissa output MAN [52:0] is selected depending on bit 105 after rounding. In FIG. 3, L, G, R, and S represents the LSB, guard, round, and sticky bits, respectively. The select logic 112 computes the SELECT[1:0] inputs to the multiplexor 113 according to the following combinational logic relationships, in which the slash (/) represents logical negation.

SELECT[1]=SUM_0[105]+c54_N·SUM_1[105]

SELECT[0]=/SELECT[1]·c54_N+SELECT[1]·c54_V

Essentially, SELECT[1] indicates whether or not overflow has occurred. SUM_0[105] is asserted when both outputs of the conditional sum adder 103 have overflown. There is only one case in which c54_N·SUM_1[105] is true in which SUM_0[105] is not also true; this case is when a carry into bit position 54, either from rounding or from the final addition of the lower bit positions of the carry-save mantissa, will cause SUM_0 to overflow. In other words, when all but the most significant bit of SUM_0 (SUM_0 [104:54]) are ones while SUM_0[105] is zero, a carry into bit position 54 will cause overflow. The c54_N·SUM_1 [105] takes care of this case because even in that case, SUM_1[105] is asserted. Thus, SELECT[1] indicates overflow for all cases. Meanwhile, SELECT[0] indicates whether or not a carry into bit position 54 has occurred for the overflow/non-overflow status indicated by SELECT[1]. SELECT[0] merely reflects which carry signal, c54_V or c54_N, should be used in correspondence to whether or not overflow has occurred. SELECT[1:0] fully specifies which output mantissa combination MAN[52:0] is appropriate.

Figure 6:
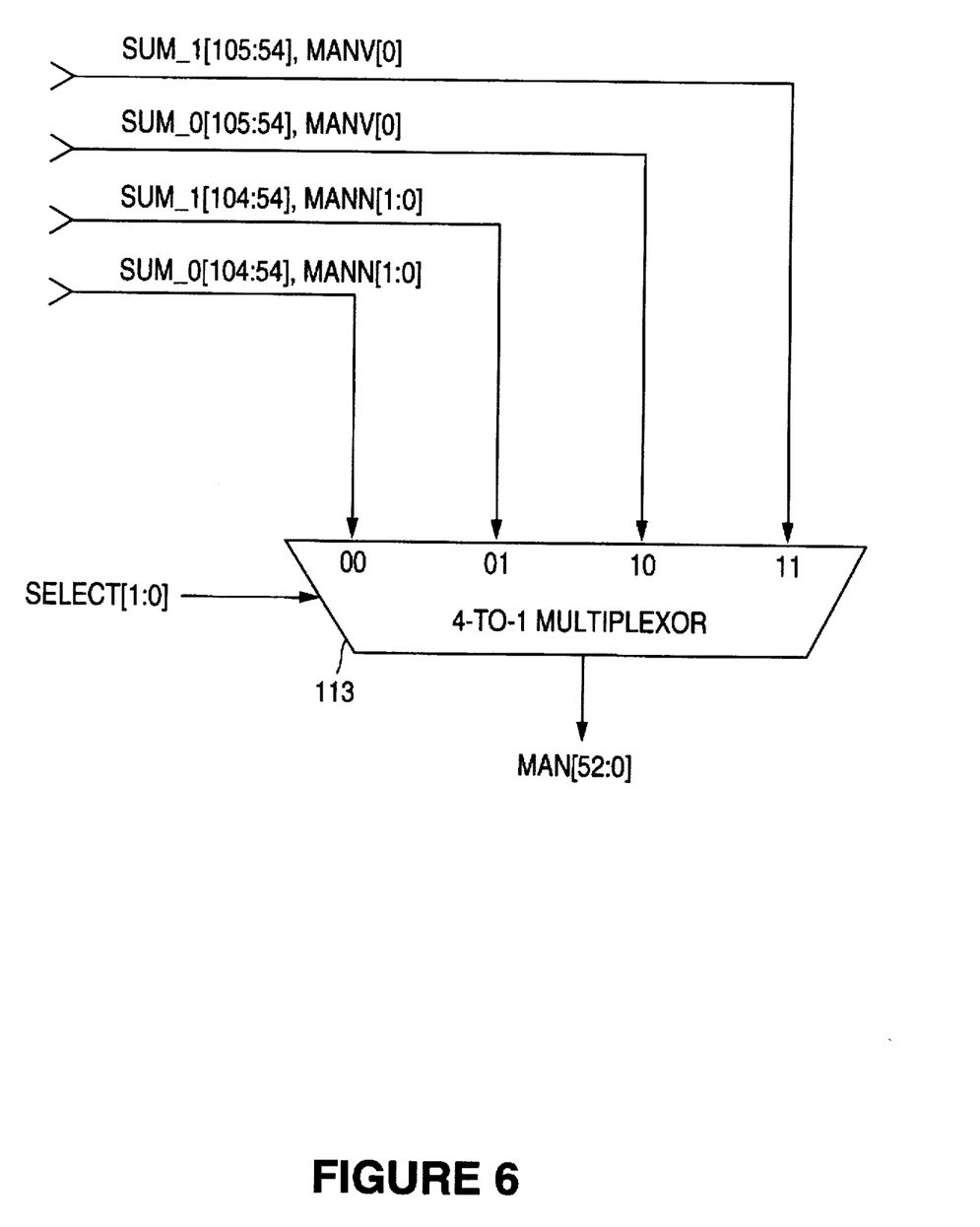
FIG. 6 illustrates the multiplexor structure for selecting the proper mantissa output according to the present invention.

The 4-to-1 multiplexor 113 selects the appropriate resultant mantissa MAN[52:0]. There are four possible output combinations. FIG. 6 shows how the inputs to the multiplexor 113 are connected so as to produce the correct 53-bit mantissa. The following table illustrates the possible bits which can be chosen to constitute the output mantissa MAN[52:0].

| SELECT [1:0] | MAN[52:0] | Conditions |
| --- | --- | --- |
| 00 | SUM_0[104:54], MAN_N[1:0] | (Non-overflow, +0) |
| 01 | SUM_1[104:54], MAN_N[1:0] | (Non-overflow, +1) |
| 10 | SUM_0[105:54], MAN_V[0] | (Overflow, +0) |
| 11 | SUM_1[105:54], MAN_V[0] | (Overflow, +1) |

Referring back to FIG. 4, the conditional sum adder 103 always provides the final mantissa bits to the left of the line 200 enclosed in the rectangles, whereas either the non-overflow adder 105 or the overflow adder 106 provides the final mantissa bits to the right of the line 200 enclosed in the rectangles.

A conditional sum adder takes two inputs, A and B, and produces two outputs, Sum0 and Sum1. It behaves according to the following equations.

Sum0=A+B

Sum1=A+B+1

If one of the inputs is set equal to zero, then the following equations are true for a conditional sum adder 103.

B=0

Sum0=A

Sum1=A+1

It is apparent from the above relations that the conditional sum adder 103 is easily configured so as to perform incrementing merely by setting one of its inputs to zero. Because the conditional sum adder produces both the incremented and original versions of its non-zero input if configured such that one of its inputs is zero, the incrementing is performed speculatively, so that the correct output can be selected by a multiplexor.

According to a third aspect of the present invention, the approach of using the conditional sum adder 103 as a speculative incrementer to accommodate division is employed to avoid having to use a separate incrementer for division. When the division/square unit's output is directed to the final addition and rounding datapath 300, the conditional sum adder 103 is operative only to speculatively compute the incremented version of the non-redundant mantissa to prepare for the instance where rounding requires incrementing. Referring back to FIG. 2, when the M/D signal is deasserted, such that the divide/square-root unit 302 is connected to the inputs of the final addition and rounding datapath 300, the following relations hold, in which DMAN[55:0] represents the mantissa output 305 of the division/square-root unit 302.

SM[105:50]=DMAN[55:0]

SM[49:0]=0

CR[105:0]=0

Therefore, all inputs to the final addition and rounding datapath 300 are zero except the most significant 56 bits of the sum input, SM[105:51], which are output from the division/square root unit. When configured in this manner, as depicted in FIG. 2, all the hardware 300 shown in FIG. 3 correctly performs rounding for division or square root results without modification.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of the present invention as recited in the appended claims. Accordingly, various changes and modifications which are obvious to a person skilled in the art to which the invention pertains are deemed to lie within the spirit and scope of the invention as claimed.

What is claimed is:

1. An apparatus that produces a rounded mantissa output, the apparatus comprising:

a first mantissa processing unit capable of producing a second mantissa;

a multiplexor that takes the first and second mantissa as inputs and that produces a selected mantissa as output, such that the selected mantissa is equivalent either to the first mantissa or to the second mantissa; and a rounding unit that takes the selected mantissa as input and produces the rounded mantissa output, wherein the first mantissa is in carry-save format such that the first mantissa includes a first carry portion and a first sum portion.

2. An apparatus as in claim 1, wherein the first mantissa processing unit is a multiplier mantissa unit.

3. An apparatus as in claim 2, wherein the second mantissa processing unit is a division mantissa unit.

4. An apparatus as in claim 2, wherein the second mantissa processing unit is a square root mantissa unit.

5. An apparatus as in claim 2, wherein the second mantissa processing unit is a division/square root mantissa unit.

6. An apparatus as in claim 1, wherein the second mantissa is in carry-save format such that the second mantissa includes a second carry portion and a second sum portion.

7. An apparatus as in claim 6, wherein the second carry portion is zero.

8. An apparatus as in claim 7, wherein a less significant portion of the second sum portion is zero.

9. An apparatus as in claim 8, wherein the first carry portion, the first sum portion, the second carry portion, and the second sum portion each include 106 bits, and wherein the less significant portion of the second sum portion includes 50 bits.

10. A mantissa final addition and rounding unit that has a mantissa carry input and a mantissa sum input and that produces a rounded mantissa output, the mantissa final addition and rounding unit comprising:

a conditional sum adder that takes a first adder input which includes upper bits of the mantissa carry input and a second adder input which includes upper bits of the mantissa sum input and that produces a first adder output and a second adder output, such that the first adder output represents an arithmetic addition of the first and second adder inputs and the second adder output is equal to one plus the arithmetic addition of the first and second adder inputs;

a rounding mantissa processing unit that takes a first rounding input which includes lower bits of the mantissa carry input and a second rounding input which includes lower bits of the mantissa sum input and that produces a carry select signal; and a multiplexor that takes the first and second adder outputs and the carry select signal as inputs and that produces the rounded mantissa output, such that the rounded mantissa output equals the first adder output if the carry select signal is deasserted, and such that the rounded mantissa output equals the second adder output if the carry select signal is asserted.

11. A mantissa final addition and rounding unit as in claim 10, wherein the upper bits of the mantissa carry input are carry outputs of a row of half adders, while the upper bits of the mantissa sum input are sum outputs of the row of half adders, wherein the row of half adders takes a carry-save upper mantissa input having a carry part and a sum part.

12. An apparatus that produces a rounded mantissa output, the apparatus comprising:

a first mantissa processing unit capable of producing a first mantissa in carry-save form such that the first mantissa has a first carry portion and a first sum portion;

a second mantissa processing unit capable of producing a second mantissa in carry-save form such that the second mantissa has a second carry portion and a second sum portion;

a multiplexor that takes the first and second mantissas as inputs and that produces a selected mantissa as output, such that the selected mantissa has a selected carry portion and a selected sum portion and is equivalent either to the first mantissa or the second mantissa; and a final addition and rounding unit that takes the selected carry portion and the selected sum portion as inputs and produces the rounded mantissa output, the final addition and rounding unit having a conditional sum adder that takes a first adder input which includes upper bits of the mantissa carry input and a second adder input which includes upper bits of the mantissa sum input and that produces a first adder output and a second adder output such that the first adder output represents an arithmetic addition of the first and second adder inputs and the second adder output is equal to one plus the arithmetic addition of the first and second adder inputs;

a rounding mantissa processing unit that takes a first rounding input which includes lower bits of the mantissa carry input and a second rounding input which includes lower bits of the mantissa sum input and that produces a carry select signal; and a multiplexor that takes the first and second adder outputs and the carry select signal as inputs and that produces the rounded mantissa output, such that the rounded mantissa output equals the first adder output if the carry select signal is deasserted, and such that the rounded mantissa output equals the second adder output if the carry select signal is asserted.

13. A mantissa final addition and rounding unit that takes a mantissa carry input and a mantissa sum input and that produces a rounded mantissa output, the mantissa final addition and rounding unit comprising:

a conditional sum adder that takes a first adder input which includes upper bits of the mantissa carry input and a second adder input which includes upper bits the mantissa sum input and that produces a first adder output and a second adder output, such that the first adder output represents an arithmetic addition of the first and second adder inputs and the second adder output is equal to one plus the arithmetic addition of the first and second adder inputs;

a rounding mantissa processing unit that takes a first rounding input which includes lower bits of the mantissa carry input and a second rounding input which includes lower bits of the mantissa sum input and that produces a non-overflow mantissa portion, an overflow mantissa portion, a non-overflow carry signal, and an overflow carry signal as outputs; and a multiplexor taking the first adder output, the second adder output, the non-overflow mantissa portion, the overflow mantissa portion, and first and second multiplexor control signals as inputs and producing the rounded mantissa output, such that the rounded mantissa output is either the non-overflow mantissa portion appended to the first adder output, the non-overflow mantissa portion appended to the second adder output, the overflow mantissa portion appended to the first adder output, or the overflow mantissa portion appended to the second adder output.

14. A mantissa final addition and rounding unit as in claim 13, further comprising:

a select logic unit that takes a first most significant bit of the first adder output, a second most significant bit of the second adder output, the non-overflow carry signal, and the overflow carry signal as inputs and produces the first and second multiplexor control signals as outputs.

15. A mantissa final addition and rounding unit as in claim 14, wherein the rounding mantissa processing unit includes:

a less significant final add unit that produces a final add carry signal, an LSB signal, a guard signal, a round signal, and a sticky signal as outputs; and a rounding logic unit that takes the LSB signal, the guard signal, the round signal, and the sticky signal as inputs and produces a non-overflow round signal and an overflow round signal as outputs.

16. A mantissa final addition and rounding unit as in claim 15, wherein the rounding mantissa processing unit further includes:

a non-overflow adder that takes the non-overflow round signal, the LSB signal, and the guard signal as inputs and produces the non-overflow mantissa portion and a non-overflow rounding carry signal as outputs; and an overflow adder that takes the overflow round signal, and the LSB signal as inputs and produces the overflow mantissa portion and an overflow rounding carry signal as outputs.

17. A mantissa final addition and rounding unit as in claim 16, wherein the rounding mantissa processing unit further includes:

a non-overflow OR gate that takes the final add carry signal and the non-overflow rounding carry signal as inputs and produces the non-overflow carry signal as output; and an overflow OR gate that takes the final add carry signal and the overflow rounding carry signal as inputs and produces the overflow carry signal as output.

18. A mantissa final addition and rounding unit as in claim 15, wherein the rounding logic unit takes a sign input and mode inputs.

19. A mantissa final addition and rounding unit as in claim 15, wherein the less significant final add unit includes:

a sticky unit that takes a less significant portion of the lower bits of the mantissa carry input and a less significant portion of the lower bits of the mantissa sum input as inputs and produces the sticky signal and a sticky carry signal as outputs; and a rounding bits propagate adder that takes a more significant portion of the lower bits of the mantissa carry input, a more significant portion of the lower bits of the mantissa sum input, and the sticky carry signal as inputs and produces the final add carry signal and the LSB signal, the guard signal, and the round signal as outputs.

20. A mantissa final addition and rounding unit as in claim 19, wherein the upper bits of the mantissa carry input and the more significant portion of the lower bits of the mantissa carry input are carry outputs of a row of half adders, while the upper bits of the mantissa sum input and the more significant portion of the lower bits of the mantissa sum input are sum outputs of the row of half adders, wherein the row of half adders takes a carry-save upper mantissa input having a carry part and a sum part.

21. A mantissa final addition and rounding unit as in claim 20, wherein the mantissa carry input has 106 bits, the mantissa sum input has 106 bits, the rounded mantissa output has 53 bits, the first adder input has 52 bits, the second adder input has 52 bits, the first adder output has 52 bits, the second adder output has 52 bits, the first rounding input has 54 bits, the second rounding input has 54 bits, the non-overflow mantissa portion has 2 bits, the overflow mantissa portion has 1 bit, the less significant portion of the lower bits of the mantissa carry input has 51 bits, the less significant portion of the lower bits of the mantissa sum input has 51 bits, the more significant portion of the lower bits of the mantissa carry input has 3 bits, and the more significant portion of the lower bits of the mantissa sum portion has 3 bits.

22. A method of providing a floating point unit that produces a rounded mantissa output, the method comprising steps of:

providing a first mantissa processing unit capable of producing a first mantissa;

providing a second mantissa processing unit capable of producing a second mantissa;

providing a multiplexor that takes the first and second mantissas as inputs and that produces a selected mantissa as output, such that the selected mantissa is equivalent either to the first mantissa or to the second mantissa; and providing a rounding unit that takes the selected mantissa as input and produces the rounded mantissa output, wherein the first mantissa is in carry-save format such that the first mantissa includes a first carry portion and a first sum portion.

23. A method of providing a floating point unit as in claim 22, wherein the first mantissa processing unit is a multiplier mantissa unit.

24. A method of providing a floating point unit as in claim 23, wherein the second mantissa processing unit is a division mantissa unit.

25. A method of providing a floating point unit as in claim 23, wherein the second mantissa processing unit is a square root mantissa unit.

26. A method of providing a floating point unit as in claim 23, wherein the second mantissa processing unit is a division/square root mantissa unit.

27. A method of providing a floating point unit as in claim 22, wherein the second mantissa is in carry-save format such that the second mantissa includes a second carry portion and a second sum portion.

28. A method of providing a floating point unit as in claim 27, wherein the second carry portion is zero.

29. A method of providing a floating point unit as in claim 28, wherein a less significant portion of the second sum portion is zero.

30. A method of providing a floating point unit as in claim 29, wherein the first carry portion, the first sum portion, the second carry portion, and the second sum portion each include 106 bits, and wherein or the less significant portion of the second sum portion includes 50 bits.

* * * * *

UNITED STATES PATENT AND TRADEMARK OFFICE
CERTIFICATE OF CORRECTION

PATENT : 5,671,171

DATED : September 23, 1997

INVENTOR(S): Robert K. Yu et al.

It is certified that error appears in the above-identified patent and that said Letters Patent is hereby corrected as shown below:

In column 10, (claim 1) lines 37-50, should read as follows:

--1. An apparatus that produces a rounded mantissa output, the apparatus comprising:
    a first mantissa processing unit capable of producing a first mantissa;
    a second mantissa processing unit capable of producing a second mantissa;
    a multiplexor that takes the first and second mantissas as inputs and that produces a selected mantissa as output, such that the selected mantissa is equivalent either to the first mantissa or to the second mantissa; and
    a rounding unit that takes the selected mantissa as input and produces the rounded mantissa output,
    wherein the first mantissa is in carry-save format such that the first mantissa includes a first carry portion and a first sum portion.--

Signed and Sealed this

Second Day of December, 1997

*Attest:*

BRUCE LEHMAN

*Attesting Officer*    *Commissioner of Patents and Trademarks*